United States Patent [19]

Mizuhara

[11] Patent Number: 4,497,772

[45] Date of Patent: Feb. 5, 1985

[54] REACTIVE METAL-PALLADIUM-COPPER-NICKEL BRAZING ALLOYS

[75] Inventor: Howard Mizuhara, Hillsborough, Calif.

[73] Assignee: GTE Products Corporation, Stamford, Conn.

[21] Appl. No.: 475,265

[22] Filed: Mar. 14, 1983

Related U.S. Application Data

[63] Continuation-in-part of Ser. No. 422,625, Sep. 24, 1982.

[51] Int. Cl.³ .................. C22C 19/00; C22C 9/06
[52] U.S. Cl. ..................... 420/457; 420/485; 420/488; 420/587; 228/263.11; 219/85 H
[58] Field of Search ............. 420/456, 457, 488, 485, 420/497, 587, 492; 148/426, 435, 442; 228/263.11; 219/85 H

[56] References Cited

U.S. PATENT DOCUMENTS

| | | | |
|---|---|---|---|
| 2,964,398 | 12/1960 | Rhys | 420/587 |
| 3,085,320 | 7/1958 | Rhys | 420/587 |
| 3,277,150 | 10/1966 | Rhys et al. | 420/456 |
| 3,438,770 | 4/1969 | Clark | 420/456 |
| 3,597,194 | 8/1971 | Savage | 420/463 |

OTHER PUBLICATIONS

Rhys et al., "The Development of Palladium Brazing Alloys," *Metallurgia*, Dec. 1962, pp. 225–263.

*Primary Examiner*—L. Dewanyne Rutledge
*Assistant Examiner*—Debbie Yee
*Attorney, Agent, or Firm*—Donald R. Castle

[57] ABSTRACT

Reactive metal-palladium-copper-nickel alloys are suitable for brazing ceramics, other non-metallic and metallic materials.

4 Claims, No Drawings

REACTIVE METAL-PALLADIUM-COPPER-NICKEL BRAZING ALLOYS

CROSS REFERENCE TO RELATED APPLICATION

This application is a continuation-in-part of U.S. application Ser. No. 422,625 filed Sept. 24, 1982 and assigned to assignee of the present invention.

FIELD OF INVENTION

This invention relates to brazing alloys. More particularly it relates to brazing alloys containing a reactive metal, palladium, copper and nickel.

BACKGROUND

Alloys containing titanium are known. These alloys contain relatively high levels of titanium. Generally the titanium content is above about 7% by weight. These alloys are not ductile and can not be rolled to a foil in a satisfactory manner and upon brazing contain a brittle dispersed phase.

With regard to brazing a ceramic material to a metal member, the reliability of the brazed joint is good when the brazing alloy is ductile. A ductile alloy is necessary because of the thermal expansion mismatch between metal and ceramic members.

SUMMARY OF THE INVENTION

Reactive metal-alloys containing specified amounts of palladium, nickel and copper are ductile and after brazing are relatively free of hard dispersed phases.

DETAILS OF PREFERRED EMBODIMENTS

For a better understanding of the present invention, together with other and further objects, advantages and capabilities thereof, reference is made to the following disclosure and appended claims in connection with the above description of some of the aspects of the invention.

The amount of the reactive metal in the alloys of this invention which also contain palladium, copper and nickel cannot appreciably exceed about 5% by weight and achieve a ductile material which upon brazing is free of dispersed phases.

The amount of reactive metal in the alloys of this invention is from about 0.05% by weight to about 5% by weight, with from about 1% by weight to about 3% by weight being preferred. By reactive metal, within the context of this disclosure, is meant titanium, zirconium, vanadium and mixtures thereof. While titanium generally is the preferred reactive metal, alloy compositions of Ti-Zr and Ti-V are equally effective.

The weight percent of palladium, can vary from about 5% by weight to about 35% by weight. The preferred level is generally from about 10% by weight to about 30% by weight.

The balance of the alloy is a mixture of copper and nickel. The minimum copper content is about 20% by weight of the total alloy and the minimum nickel content is about 10% by weight of the total alloy. The maximum copper content is about 84% of the total alloy and the maximum nickel content is about 50% by weight of the total alloy.

Various alloys are prepared by skull melting using a tungsten electrode and an argon atmosphere. The alloys are ductile and are rolled to foils using an intermediate vacuum anneal. The thickness of the foil is of from about 2 to 6 mils.

The compositions of the alloys and their melting temperatures are given in Table 1.

TABLE 1

| Alloy | Element (% by weight) | | | | Melting Point °C. |
|---|---|---|---|---|---|
| | Ti | Pd | Cu | Ni | |
| 1 | 2 | 10 | 68 | 20 | 1175 |
| 2 | 1 | 30 | 58 | 10 | 1150 |
| 3 | 2 | 15 | 33 | 50 | 1300 |

The alloys are suitable for a variety of brazing applications. For example, the alloys are useful for brazing ceramics to ferrous base alloys such as brazing alumina to an iron-nickel-cobalt alloy known as Kovar, a trademark of Westinghouse Electric Corporation; for brazing superalloys such as the nickel-iron-chromium alloy Inconel, a trademark of International Nickel Co. and for brazing stainless steel such as 304 stainless steel.

EXAMPLE 1

A 2 mil foil of 5% Pd, 62% Cu, 31% Ni, 2% Ti alloy was placed between a 97.5% alumina body produced and sold by WESGO Division of GTE Products Corporation under the trademark of Al-300, and a Kovar metallic sheet and brazed under $10^{-5}$ mm Hg vacuum at about 1280° C. The alloy melts and brazes the alumina body to the metal sheet with excellent results. Another Kovar sheet is placed on the opposite face of the same alumina body with a 2 mil foil of 30% Pd, 58% Cu, 10% Ni, 1% Ti placed therebetween. The total assembly is heated to 1190° C. in a $10^{-5}$ mm Hg vacuum resulting in a second successful braze on a same sassembly without melting the original braze. The technique is called step brazing and additional brazes can be carried out using lower temperature brazing alloys on the same assembly.

EXAMPLE 2

A 2 mil foil of 15% Pd, 33% Cu, 50Ni, 2% Ti is placed at each end between a 97.5% alumina body which is produced and sold by WESGO Division, of GTE Products Corporation under the Trademark of AL-300, and a molybdenum tubing having a 0.250" diameter and is 0.250" long. The tubing has as 10 mil wall thickness. The molybdenum assembly with the alumina discs at each end is placed in a vacuum furnace and heated to about 1330° C. under $10^{-5}$ mm vacuum. The brazed assembly is hermetically sound.

While there has been shown and described what are at present considered the preferred embodiments of the invention, it will be obvious to those skilled in the art that various changes and modifications may be made therein without departing from the scope of the invention as defined by the appended claims.

What is claimed is:

1. A ductile brazing foil having a composition consisting essentially of from about 0.05% to about 5% by weight of a reactive metal selected from the group consisting of titanium, vanadium, zirconium and mixtures thereof, from about 5% by weight to about 30% by weight of palladium and the balance is a mixture of copper and nickel wherein the minimum amount of copper is about 20% by weight of the total alloy, the minimum amount of nickel is about 105 by weight of the total alloy, the maximum amount of copper is about 70% by weight of the total alloy and the maximum amount of nickel is about 50% by weight of the total alloy.

2. A foil according to claim 1 wherein said reactive metal is titanium.

3. A foil according to claim 2 wherein titanium is present in an amount of from about 1% to about 3% by weight.

4. A foil according to claim 3 wherein palladium is present in an amount of from about 10% to about 30% by weight.

* * * * *

UNITED STATES PATENT AND TRADEMARK OFFICE
CERTIFICATE OF CORRECTION

PATENT NO. : 4,497,772

DATED : February 5, 1985

INVENTOR(S) : Howard Mizuhara

It is certified that error appears in the above-identified patent and that said Letters Patent are hereby corrected as shown below:

Claim 1, line 67 should read

-- minimum amount of nickel is about 10% by weight of the --

Signed and Sealed this

Fifth Day of August 1986

[SEAL]

Attest:

DONALD J. QUIGG

Attesting Officer

Commissioner of Patents and Trademarks